US012104144B2

(12) United States Patent
Li et al.

(10) Patent No.: US 12,104,144 B2
(45) **Date of Patent: *Oct. 1, 2024**

(54) TEXTILE BLEACHING AND DISINFECTING USING THE MIXTURE OF HYDROPHILIC AND HYDROPHOBIC PEROXYCARBOXYLIC ACID COMPOSITION

(71) Applicant: ECOLAB USA INC., Saint Paul, MN (US)

(72) Inventors: Junzhong Li, Saint Paul, MN (US); Allison Prideaux, Saint Paul, MN (US); David Dotzauer, Saint Paul, MN (US); Jonathan P. Fast, Saint Paul, MN (US); Richard Staub, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/330,094

(22) Filed: Jun. 6, 2023

(65) Prior Publication Data

US 2023/0313076 A1 Oct. 5, 2023

Related U.S. Application Data

(63) Continuation of application No. 16/946,329, filed on Jun. 17, 2020, now Pat. No. 11,713,436.

(Continued)

(51) Int. Cl.

*C11D 3/48* (2006.01)
*C11D 1/14* (2006.01)

(Continued)

(52) U.S. Cl.

CPC ................ *C11D 3/48* (2013.01); *C11D 1/143* (2013.01); *C11D 3/3955* (2013.01); *C11D 3/3956* (2013.01); *C11D 2111/12* (2024.01)

(58) Field of Classification Search

CPC ......... C11D 3/48; C11D 1/143; C11D 3/3955; C11D 211/12

See application file for complete search history.

(56) References Cited

U.S. PATENT DOCUMENTS

| | | | | |
|---|---|---|---|---|
| 4,532,063 A | | 7/1985 | Gueldenzopf | |
| 5,104,584 A | * | 4/1992 | Kong ....................... | C11D 1/30 510/318 |

(Continued)

FOREIGN PATENT DOCUMENTS

| | | | |
|---|---|---|---|
| CA | 2347423 | C | 6/2009 |
| CN | 101233852 | A | 8/2008 |

(Continued)

OTHER PUBLICATIONS

Vasseur et al., "Combined Effects of NaCl, NaOH, and Biocides (Monolaurin or Lauric Acid) on Inactivation of *Listeria monocytogenes* and *Pseudomonas* spp.", Journal of Food Protection, vol. 64, No. 9, pp. 1442-1445, Jan. 19, 2001.

(Continued)

*Primary Examiner* — Liam J Heincer
*Assistant Examiner* — M. Reza Asdjodi
(74) *Attorney, Agent, or Firm* — McKee, Voorhees & Sease, PLC

(57) ABSTRACT

Liquid peroxycarboxylic acid laundry compositions, namely bleaching and disinfecting compositions combining mixed peroxycarboxylic acids to provide synergistic efficacy are disclosed. Methods of using the liquid peroxycarboxylic acid laundry compositions for low temperatures and a use pH with detergent and water from about 6 to about 10 are (Continued)

also disclosed. Beneficially, the liquid peroxycarboxylic acid laundry compositions and methods of using the same do not include sulfonated peroxycarboxylic acids and sulfonated carboxylic acid, such as peroxy sulfonated oleic acid/sulfonated oleic acid (PSOA/SOA).

16 Claims, 2 Drawing Sheets

Related U.S. Application Data

(60) Provisional application No. 62/862,194, filed on Jun. 17, 2019.

(51) Int. Cl.
*C11D 3/395* (2006.01)
*C11D 11/00* (2006.01)

(56) References Cited

U.S. PATENT DOCUMENTS 5,200,189 A 4/1993 Oakes et al.
5,437,868 A * 8/1995 Oakes ...................... C11D 3/48 424/405
5,489,434 A * 2/1996 Oakes .................... A01N 37/16 424/405
5,616,281 A 4/1997 Hardy et al.
5,718,910 A 2/1998 Oakes et al.
5,759,439 A 6/1998 Kott et al.
5,977,403 A 11/1999 Byers
5,981,463 A 11/1999 Oberlander et al.
6,010,729 A 1/2000 Gutzmann et al.
6,326,032 B1 12/2001 Richter et al.
6,472,027 B1 10/2002 Olson et al.
6,472,358 B1 10/2002 Richter et al.
6,593,283 B2 7/2003 Hei et al.
6,627,592 B1 9/2003 Shamayeli et al.
6,627,593 B2 9/2003 Hei et al.
6,627,657 B1 * 9/2003 Hilgren .................. A01N 37/16 514/568
6,635,286 B2 10/2003 Hei et al.
6,683,040 B2 1/2004 Bragulla et al.
6,693,069 B2 2/2004 Körber et al.
6,908,891 B2 6/2005 Biering et al.
7,049,277 B2 5/2006 Bragulla
7,150,884 B1 12/2006 Hilgren et al.
7,498,051 B2 3/2009 Man et al.
7,682,403 B2 3/2010 Gohl et al.
8,146,299 B2 4/2012 Stearns et al.
8,729,296 B2 5/2014 Fast et al.
8,822,719 B1 9/2014 Li et al.
8,828,910 B2 9/2014 Aksela et al.
8,858,895 B2 10/2014 Kraus et al.
8,871,807 B2 10/2014 Gohl et al.
9,034,390 B2 5/2015 Kielbania, Jr.
9,044,527 B2 6/2015 Neas et al.
9,241,483 B2 1/2016 Golden et al.
9,271,494 B2 3/2016 Pedersen et al.
9,283,202 B2 3/2016 Neas et al.
9,288,992 B2 3/2016 Li et al.
9,560,874 B2 2/2017 Gutzmann et al.
9,701,931 B2 7/2017 Moore
9,752,109 B2 9/2017 Dürrschmidt et al.
9,763,442 B2 9/2017 Li et al.
10,165,774 B2 1/2019 Li et al.
10,233,149 B2 3/2019 Balasubramanian et al.
11,026,420 B2 * 6/2021 Li ............................ A61L 2/18
2002/0123447 A1 * 9/2002 Manske ............... C11D 3/3757 510/508
2002/0168422 A1 11/2002 Hei et al.
2003/0070691 A1 4/2003 Giletto et al.
2006/0204467 A1 9/2006 Littau et al.
2009/0263539 A1 * 10/2009 Herdt ........................ A61L 2/18 426/8
2009/0269324 A1 * 10/2009 Herdt .................... A23L 3/3571 424/94.4
2010/0021557 A1 * 1/2010 Li ............................ A23B 5/14 562/2
2011/0052445 A1 * 3/2011 Herdt ........................ C25B 9/00 205/688
2011/0217761 A1 * 9/2011 Hilgren ................... C02F 3/342 435/262
2012/0172439 A1 * 7/2012 Fast .................... B01F 25/4331 8/111
2013/0274334 A1 * 10/2013 Li ............................ A23B 5/14 562/2
2014/0097144 A1 * 4/2014 Li ............................ C11D 7/04 210/759
2014/0308162 A1 10/2014 Lange et al.
2015/0010646 A1 1/2015 Tiekemeier et al.
2016/0100577 A1 4/2016 Salminen et al.
2016/0176815 A1 6/2016 Li et al.
2017/0071200 A1 3/2017 McSherry et al.
2017/0086456 A1 3/2017 Man et al.
2017/0173196 A1 6/2017 Sherry et al.
2017/0173642 A1 * 6/2017 Li ........................ C11D 3/3947
2018/0168150 A1 * 6/2018 Li ............................. A61L 2/18
2018/0371375 A1 * 12/2018 Lang .................... C11D 3/3945
2019/0092661 A1 3/2019 Fast et al.
2020/0392433 A1 * 12/2020 Li ........................ C11D 3/3902

FOREIGN PATENT DOCUMENTS

| | | | |
|---|---|---|---|
| CN | 106854561 | A | 6/2017 |
| DE | 20016556 | U1 | 2/2002 |
| DE | 10162646 | A1 | 7/2003 |
| EP | 0461700 | A1 | 12/1991 |
| EP | 0569066 | B1 | 11/1993 |
| EP | 0660666 | A1 | 7/1995 |
| EP | 0823474 | A1 | 2/1998 |
| EP | 0693876 | B1 | 7/1998 |
| EP | 1265486 | B1 | 12/2002 |
| EP | 1302108 | A2 | 4/2003 |
| EP | 1561801 | A1 | 8/2005 |
| EP | 1141212 | B1 | 8/2007 |
| EP | 1855579 | B1 | 11/2007 |
| EP | 2797845 | A2 | 11/2014 |
| EP | 2903939 | B1 | 8/2015 |
| IN | 626KOLNP2015 | | 12/2015 |
| JP | 4680476 | B2 | 5/2011 |
| JP | 5513385 | B2 | 6/2014 |
| WO | 0212431 | A1 | 2/2002 |
| WO | 2009072097 | A1 | 6/2009 |
| WO | 2011129829 | A1 | 10/2011 |
| WO | 2012010198 | A1 | 1/2012 |
| WO | 2013043699 | A2 | 3/2013 |
| WO | 2014063107 | A2 | 4/2014 |
| WO | 2014063115 | A1 | 4/2014 |
| WO | 2016057207 | A1 | 4/2016 |
| WO | 2017044806 | A1 | 3/2017 |
| WO | 2017049076 | A1 | 3/2017 |

OTHER PUBLICATIONS

Ecolab USA Inc., PCT/US2020/038041 filed Jun. 17, 2020, "Notification of Transmittal of the International Search Report and the Written Opinion of the International Searching Authority, or the Declaration", mailed Nov. 24, 2020, 15 pages. Nov. 20, 2020.

* cited by examiner

TEXTILE BLEACHING AND DISINFECTING USING THE MIXTURE OF HYDROPHILIC AND HYDROPHOBIC PEROXYCARBOXYLIC ACID COMPOSITION

CROSS REFERENCE TO RELATED APPLICATIONS

This is a continuation application of U.S. Ser. No. 16/946,329, filed Jun. 17, 2020, which claims priority under 35 U.S.C. § 119 to provisional application Ser. No. 62/862,194, filed Jun. 17, 2019, both of which are herein incorporated by reference in their entirety.

FIELD OF THE INVENTION

The invention relates to liquid peroxycarboxylic acid laundry compositions, namely bleaching and disinfecting compositions combining mixed peroxycarboxylic acids to provide synergistic efficacy. Methods of using the liquid peroxycarboxylic acid laundry compositions for low temperatures and a use pH with detergent and water from about 6 to about 10 are provided. Beneficially, the liquid peroxycarboxylic acid laundry compositions and methods of using the same do not include sulfonated peroxycarboxylic acids/sulfonated carboxylic acids, such as peroxy sulfonated oleic acid/sulfonated oleic acid (PSOA/SOA).

BACKGROUND OF THE INVENTION

In industrial and commercial laundry facilities, textile materials such as sheets, towels, wipes, garments, tablecloths, etc. are laundered at elevated temperatures with alkaline detergents. The alkaline detergents typically contain a source of alkalinity such as an alkali metal hydroxide, alkali metal silicate, alkali metal carbonate or other base component. Additionally, the alkaline detergents typically contain surfactants or other detergent materials that can enhance soil removal from the textile materials. The detergents can also contain other components such as bleaches, brightening agents, anti-redeposition agents, etc. that are used to enhance the appearance of the resulting textile materials. These detergency components may also optionally be dosed separately from the alkaline detergent, but will all be mixed together in the laundry wash bath. The textile materials that have been treated with an alkaline detergent are typically treated with a commercial or industrial sour composition that contains acid components for neutralizing alkaline residues on the fabric to enhance skin compatibility. A fabric sour composition that provides sanitizing properties is described by U.S. Pat. No. 6,262,013 to Smith et al.

In a conventional, industrial laundry washing facility, textile materials can be subjected to several treatment steps in an industrial sized laundry washing machine to provide cleaning. Exemplary treatment steps include a presoak step, a wash step that often occurs at a pH of about 11 to 12, a rinse step and/or multiple rinse steps for the removal of soil containing wash liquor which incrementally lower the pH, and a sour step that brings the final pH to about 5 to 7, and an extract step that often involves spinning the textiles to remove water. An antimicrobial composition is typically applied concurrently with the detergent, as in an all-in-one product, or during the sour step where it is afforded a minimum contact time in the absence of other cleaning chemicals.

There are ongoing efforts to improve both consumer and industrial laundry washing techniques. Such improvements desired by consumers and industry may include a reduction in processing time, cost of materials, materials consumption, energy costs, and water consumption.

Conventional bleaching and disinfection compositions used in laundering and various other cleaning applications, particularly those intended for institutional use, generally contain peroxy sulfonated peroxycarboxylic acids, including for example peroxy sulfonated oleic acid/sulfonated oleic acid (PSOA/SOA). PSOAs/SOAs play a vital role in laundry bleaching and disinfectant compositions as couplers for medium chain peroxycarboxylic acids, and as an efficient bleach reagent and disinfectant.

However, while effective, SOAs used to generate PSOAs are disfavored due to increasing regulatory restrictions and adverse classifications, such as in the European market, limiting or precluding use of the bleaching and disinfectant components. Therefore, there is a need for laundering and other cleaning application peracid compositions that do not contain SOAs/PSOAs. Moreover, there is an ongoing commercial demand for environmentally friendly and biodegradable alternatives, including those that can replace SOAs/PSOAs in laundry bleaching and disinfectant compositions and other hard surface disinfectant compositions.

There is also a need for continued development of low temperature laundry compositions and methods suitable for use thereof. Beneficially, reducing temperatures employed in laundering systems can provide energy savings and other benefits for consumers. However, with the move towards more environmentally-friendly and sustainable laundry products, laundering processes, and laundry washing machine applications, there is a need to ensure that the textile cleaning, staining, and freshness profiles remain acceptable. In particular, for low temperature washing conditions, the reaction kinetics of laundering processes are reduced, in addition to potentially affecting deposition performance and odor release profiles.

It is therefore an objective to develop low temperature laundry bleaching and disinfectant compositions that are SOA/PSOA-free. However, the removal of SOA/PSOA having known coupling activity in a mixed peracid composition presents formulation challenges.

It is a further objective to provide SOA/PSOA-free low temperature laundry bleaching and disinfectant compositions that provide effective antimicrobial efficacy under neutral to alkaline pH conditions, including efficacy against mycobacteria.

It is another objective to develop methods of employing SOA/PSOA-free laundry bleaching and disinfectant compositions and hard surface disinfectant compositions under low temperature laundering conditions and having antimicrobial efficacy on textiles.

Other objects, aspects and advantages of the methods and compositions will be apparent to one skilled in the art in view of the following disclosure, the drawings, and the appended claims.

SUMMARY OF THE INVENTION

An advantage of compositions and methods disclosed herein is effective management of reducing and/or eliminating microbial populations in industrial and commercial laundering systems through the use of the peracid compositions described herein. More preferably, the invention is effective at reducing and/or eliminating mycobacteria in industrial and commercial laundering systems. The present invention provides laundry bleaching and disinfectant compositions which include a mixed peracid composition for low temperature laundry bleaching and disinfection utilizing environmentally-friendly ingredients that work at least as well as compositions containing SOA/PSOA. In one embodiment, the present invention is a laundry bleaching and disinfecting concentrate composition diluted with detergent and water to form a use solution. The low temperature laundry bleaching and disinfection composition is substantially free of SOA/PSOA, or preferably is free of SOA/PSOA.

In an embodiment, the present invention is a composition comprising a $C_1$-$C_4$ peroxycarboxylic acid, a $C_5$-$C_{22}$ peroxycarboxylic acid, at least one organic acid, an oxidizing agent, and a hydrotrope, wherein the composition is SOA/PSOA-free. The composition may further include at least one additional agent comprising a stabilizing agent, a solvent, a surfactant, or combinations thereof.

In a further embodiment, the present invention is a composition comprising peroxyacetic acid, peroxyoctanoic acid, acetic acid, octanoic acid, hydrogen peroxide, and a secondary alkane sulfonate, wherein the composition is SOA/PSOA-free. The composition may further include at least one additional agent comprising a stabilizing agent, a solvent, a surfactant, or combinations thereof.

Beneficially, the compositions provide a combination of hydrophilic and hydrophobic peroxycarboxylic acids for efficacious laundry treatment. In particular, the hydrophilic peracid (e.g. peracetic acid) is particularly efficient in bleaching hydrophilic soils and leaving no resides on treated surfaces, and is used in combination with a hydrophobic peracid (e.g. peroctanoic acid) that is very efficient in bleaching hydrophobic soils and efficient under low temperatures. A peroxycarboxylic acid-stable surfactant is used to couple hydrophobic peracid in the concentrate composition, and also solubilize the hydrophobic peracid in use solution to prevent it from leaving residue on the treated fabrics. The peracid compatible surfactant chosen does not contain sulfonated oleic acids.

In still a further embodiment, the present invention is a method of bleaching and disinfecting laundry articles and/or other hard surfaces. The method includes forming a peracid composition comprising the embodiments of the compositions described herein, contacting a soiled article or surface with the peracid composition, and disinfecting and/or bleaching the article or surface.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
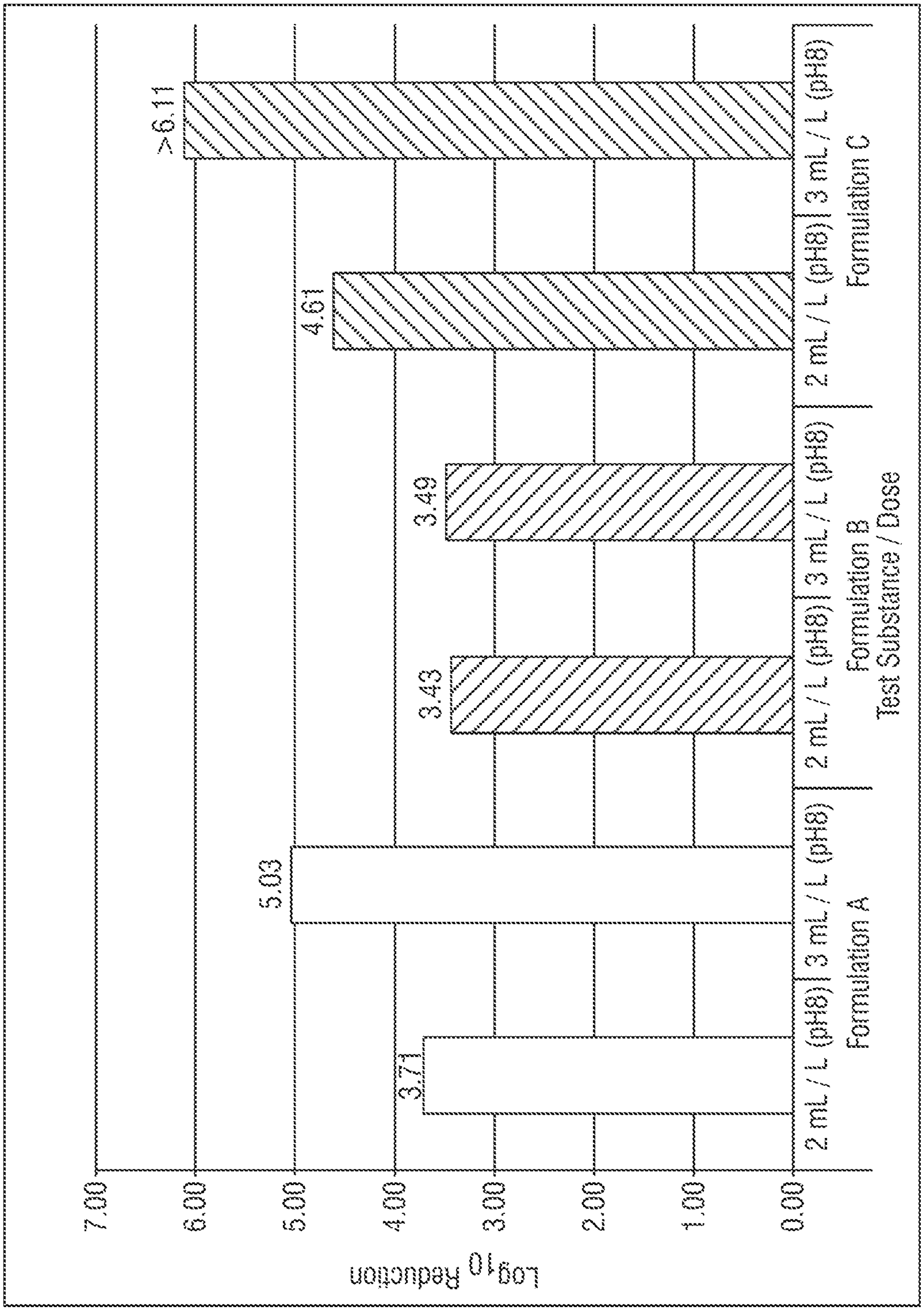
FIG. 1 shows a graph measurement of the $\log_{10}$ reduction of *Mycobacterium avium* after a 10 minute exposure to Formulation A, Formulation B, and Formulation C of the evaluated laundry bleach and disinfectant compositions disclosed in the Examples.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The present invention relates to laundering bleaching and disinfecting compositions and methods of employing the same. The peracid compositions and methods of employing have advantages over conventional bleaching and disinfectant compositions utilized for laundry systems. For example, the peracid compositions of the invention are not only effective in reducing and preventing microbial growth, but also are effective in bleaching soils while reducing odor and residues left on treated fabrics, including at low temperature applications and in SOA/PSOA-free compositions and conditions of use to overcome restrictions of using such SOA/PSOA-containing formulations.

The embodiments are not limited to particular SOA/PSOA-free peracid compositions and methods of using the same in laundering bleaching and disinfectant applications, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture.

Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "cleaning" refers to a method used to facilitate or aid in soil removal, bleaching, disinfecting, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. In various embodiments, successful microbial reduction is achieved when the microbial populations are reduced by at least a $\log_{10}$ reduction of 2 or greater, or more preferably of 3 or greater, or more preferably of 4 or greater.

The term "hard surface" refers to a solid, substantially non-flexible surface such as a countertop, tile, floor, wall, panel, window, plumbing fixture, kitchen and bathroom In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "cleaning" refers to a method used to facilitate or aid in soil removal, bleaching, disinfecting, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. In various embodiments, successful microbial reduction is achieved when the microbial populations are reduced by at least a $\log_{10}$ reduction of 2 or greater, or more preferably of 3 or greater, or more preferably of 4 or greater.

The term "hard surface" refers to a solid, substantially non-flexible surface such as a countertop, tile, floor, wall, panel, window, plumbing fixture, kitchen and bathroom The term "hydrotrope" means a compound that solubilizes hydrophobic compounds in aqueous solutions (by means other than micellar solubilization). Typically, hydrotropes consist of a hydrophilic part and a hydrophobic part (like surfactants) but the hydrophobic part is generally too small to cause spontaneous self-aggregation. Hydrotropes do not have a critical concentration above which self-aggregation 'suddenly' starts to occur (as found for micelle- and vesicle-forming surfactants, which have a critical micelle concentration or CMC and a critical vesicle concentration or CVC, respectively). Instead, some hydrotropes aggregate in a step-wise self-aggregation process, gradually increasing aggregation size. However, many hydrotropes do not seem to self-aggregate at all, unless a solubilisate has been added. Examples of hydrotropes include urea, tosylate, cumene sulfonate and xylene sulfonate.

As used herein, the term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillowcases, towels, table linen, tablecloth, bar mops and uniforms. The invention additionally provides a composition and method for treating non-laundry articles and surfaces including hard surfaces such as dishes, glasses, and other ware.

The term "microemulsion" as used herein, refers to a thermodynamically stable liquid dispersion of one liquid phase into another that is stabilized by an interfacial film of surfactant. According to the invention, the aqueous compositions are not microemulsions, as they lack an oily droplet and/or other component to be dispersed within another phase. The aqueous compositions according to the present invention can be characterized as either solutions or dispersions of surfactants in an aqueous system, such as water. However, according to the invention, when an oily soil is treated according to the methods of the invention a microemulsion is formed between the aqueous composition and the oily soil.

As used herein, the terms "peroxy sulfonated oleic acid (or PSOA)-free" or "sulfonated oleic acid (or SOA)-free" refers to compositions, mixtures, or ingredients completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%. According to the invention, the compositions are both PSOA-free and SOA-free (also referred to herein as SOA/PSOA-free.

As used herein, the term "soil" or "stain" refers to a non-polar oily (hydrophobic, water-insoluble) substance which may or may not contain particulate matter such as mineral clays, sand, natural mineral matter, carbon black, graphite, kaolin, environmental dust, etc.

The term "surfactant" or "surface active agent" refers to an organic chemical that when added to a liquid changes the properties of that liquid at a surface.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

While an understanding of the mechanism is not necessary to practice the present invention and while the present invention is not limited to any particular mechanism of action, it is contemplated that, in some embodiments, a mixed peracid bleaching and disinfectant composition in addition to a secondary alkane sulfonate provides at least substantially similar cleaning efficacy to PSOA/SOA-containing mixed peracid bleaching and disinfectants, including in low temperature laundry applications of use. Beneficially, however, the compositions are free of PSOA/SOA, while providing enhanced cleaning efficacy over commercially available PSOA/SOA-containing cleaning compositions, including in low temperature laundry applications of use. Thus, the bleaching and disinfectant compositions provide a green, biodegradable replacement for conventional PSOA/SOA-containing couplers. The bleaching and disinfectant compositions can be used in various industries, including, but not limited to textile care or other laundering applications, and other hard surface cleaning applications, including, for example: bathroom surfaces, dishwashing equipment, water treatment systems, food and beverage equipment, vehicles and tabletops.

Laundry Bleaching and Disinfectant Compositions

According to an embodiment, a combination of a hydrophobic peracid and a hydrophilic peracid composition is employed for laundering systems at low temperatures, namely, to reduce and/or prevent microbial growth. In an embodiment, the peracid composition comprises a medium chain peroxycarboxylic acid, a short chain peroxycarboxylic acid, at least one organic acid comprising a medium chain carboxylic acid and a short chain carboxylic acid, an oxidizing agent, a peracid-stable surfactant to couple hydrophobic peracid(s) in the concentrate composition, a solvent (i.e. water), and optional additional functional ingredients comprising stabilizing agents, acidulants and chelating agents.

In a still further aspect, the peracid composition can be a peracid forming composition. In various aspects, the peracid composition can be formed by an organic acid and an oxidizing agent. In other aspects, peracid forming compositions may be employed to generate a peracid composition in situ. Additional description of exemplary in situ methods for peracid forming compositions is provided in U.S. Pat. Nos. 8,846,107 and 8,877,254, which are herein incorporated by reference as pertaining to methods for generating peracid compositions in situ.

The compositions are particularly suited for use as both laundry bleaching and disinfectant compositions. The liquid compositions (also referred to herein as aqueous compositions) are particularly suitable for use as a pre-formed mixed peracids or as a ready-to-use products. As referred to herein, a concentrate refers to a composition that is intended to be further diluted with water with/without detergent to provide a use solution. A use solution refers to an aqueous composition that can be applied to surfaces to provide bleaching and disinfectant activity.

The use solutions of the composition are diluted in water with/without detergent to form a use solution. The compositions may be provided in various forms for providing bleaching and disinfectant compositions for use. In an aspect, the compositions are provided as a liquid. The compositions may be dispensed from single or multi-use packaging in the various physical forms. The pH of the use solution can vary depending on the textile or laundering system that is being treated. In an embodiment, the pH of the use solution is between about 6 and about 10, preferably between about 6 and about 9, more preferably between about 7 and about 9. In a further aspect, the pH of the composition is about 8. In preferred embodiments the pH is above neutral for efficacious bleaching in laundry applications.

Peroxycarboxylic Acids

Peroxycarboxylic acids (or percarboxylic acids or peracids) generally have the formula $R(CO_3H)_n$, where, for example, R is an alkyl, arylalkyl, cycloalkyl, aromatic, or heterocyclic group, and n is one, two, or three, and named by prefixing the parent acid with peroxy. The R group can be saturated or unsaturated as well as substituted or unsubstituted. Peroxycarboxylic acids can be made by the direct action of an oxidizing agent on a carboxylic acid, by autoxidation of aldehydes, or from acid chlorides, and hydrides, or carboxylic anhydrides with hydrogen or sodium peroxide.

Peroxycarboxylic acids may include hydrophilic and/or hydrophobic peroxycarboxylic acids. As used herein, a "hydrophilic peracid" refers to a peroxycarboxylic acids that are highly miscible in water at 25° C. and having hydrophilic properties. Beneficially, the inclusion of a hydrophilic peracid contributes to efficacy in bleaching hydrophilic soils without leaving residues on treated fabrics. Examples of hydrophilic peroxycarboxylic acids include performic acid, peracetic acid, perpropionic acid, perbutyric acid, perglutaric acid. In some embodiments, the compositions and methods of the present invention include peroxyacetic acid or acetic acid. Peroxyacetic (or peracetic) acid is a peroxycarboxylic acid having the formula: $CH_3COOOH$. Generally, peroxyacetic acid is a liquid having an acrid odor at higher concentrations and is freely soluble in water, alcohol, ether, and sulfuric acid. Peroxyacetic acid can be prepared through any number of methods known to those of skill in the art including preparation from acetaldehyde and oxygen in the presence of cobalt acetate. A solution of peroxyacetic acid can be obtained by combining acetic acid with hydrogen peroxide. In a preferred embodiment, the compositions of the invention employ a C1 to C4 peroxycarboxylic acid.

As used herein, the phrase "hydrophobic peracid" refers to a peroxycarboxylic acid having a carbon chain between 5 and 22 carbons in length and has water solubility of less than 0.1% in water. Beneficially, hydrophobic peracids are hydrophobic, contributing to its efficiency in bleaching hydrophobic soils and maintaining bleaching efficacy even under low temperatures. Although it is also common for hydrophobic peroxycarboxylic acids to have the potential of leaving residues on fabrics and causing a dis-favorable odor, they are efficient in killing microorganisms such as mycobacteria, one of the most challenging pathogens to kill in qualifying as a disinfectant.

In an embodiment, hydrophobic peroxycarboxylic acids include those with solubility in water of less than 1 g/L at 25° C. Examples of medium chain peroxycarboxylic acids include perpentanoic acid, perhexanoic acid, perheptanoic acid, peroctanoic acid, pernonanoic acid, perdecanoic acid, perundecanoic acid, and perdodecanoic acid. In one embodiment, the hydrophobic peroxycarboxylic acid employed within the compositions is a C5 to C22 peroxycarboxylic acid. In a preferred embodiment, a C5 to C18 peroxycarboxylic acid is employed in the compositions described herein. In a more preferred embodiment, a C5 to C12 peroxycarboxylic acid is employed in the compositions described herein.

In some embodiments, the compositions and methods include peroxyoctanoic acid. Peroxyoctanoic (or peroctanoic) acid is a peroxycarboxylic acid having the formula, for example, of n-peroxyoctanoic acid: $CH_3(CH_2)_6COOOH$. Peroxyoctanoic acid can be an acid with a straight chain alkyl moiety, an acid with a branched alkyl moiety, or a mixture thereof. Peroxyoctanoic acid is surface active and can assist in wetting hydrophobic surfaces, such as those of microbes. Peroxyoctanoic acid can be prepared through any number of methods known to those of skill in the art. A solution of peroxyoctanoic acid can be obtained by combining octanoic acid and hydrogen peroxide. In an aspect of the invention a commercially available peroxyoctanoic acid containing product is available under the commercial name Octave® (Ecolab, Inc.). Additional description of particularly suitable peroxyoctanoic acids is disclosed in U.S. Pat. Nos. 7,498,051, 7,504,123, 7,507,429 and 7,569,232, which are herein incorporated by reference.

Exemplary peroxycarboxylic acids useful in the compositions and methods include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, or the peroxyacids of their branched chain isomers, peroxylactic, peroxymaleic, peroxyascorbic, peroxyhydroxyacetic, peroxyoxalic, peroxymalonic, peroxysuccinic, peroxyglutaric, peroxyadipic, peroxypimelic and peroxysubric acid and mixtures thereof.

In some embodiments, the compositions utilize a combination of several different peroxycarboxylic acids. There is an unexpected benefit of employing a combination of a medium chain peracid and a short chain peracid where the combination surprisingly provides a significant benefit for the inhibition of bacterial growth in laundering systems without the use of SOAs/PSOA. Without being limited to a particular theory or mechanism of the invention, the inclusion of both a hydrophilic peracid and a hydrophobic peracid contributes to increased efficiency in bleaching and disinfectant properties. In particular, the hydrophilic peracids, such as peracetic acid is very efficient in bleaching hydrophilic soils without leaving a residue on treated fabrics; whereas the hydrophobic peracid, such as peroctanoic acid is very efficient in bleaching hydrophobic soils and also is efficient under low temperature. In addition, the hydrophobic peracid is more efficient in killing mycobacteria, a challenging pathogen that must be eliminating for disinfectant classification of a composition. However, hydrophobic peracids have the potential to leave residue on the fabric and cause odor issues. Therefore, a careful balance of the ratio of hydrophilic to hydrophobic peracid is important in achieving synergistic performance as a laundry bleach and disinfectant composition. The balance of the ratio of hydrophilic to hydrophobic peracid further requires a peracid-stable coupler for the hydrophobic peracid replacing SOA/PSOA.

In some embodiments, the composition includes one or more C1 to C4 peroxycarboxylic acids and one or more C5 to C22 peroxycarboxylic acids. In some embodiments, a C1 to C4 peroxycarboxylic acid and a C5 to C12 peroxycarboxylic acid are utilized in combination. In still further embodiments, peroxyacetic acid and peroxyoctanoic acid are utilized in combination. In one aspect of the invention the ratio of short chain peracid to medium chain peracid can be about 2:1 to about 10:1, preferably from about 4:1 to about 8:1, more preferably about 5:1 to about 7:1, and most preferably about 6:1.

In a preferred aspect, the short chain peracids and medium chain peracids can be used at any suitable concentration. In some embodiments, the C1-C4 percarboxylic acid has a concentration from about 0.1 wt-% to about 40 wt-% in a concentrated equilibrium composition. In other embodiments, the C1-C4 percarboxylic acid has a concentration from about 1 wt-% to about 30 wt-%, or from about 1 wt-% to 20 wt-%. Without limiting the scope of the invention, the numeric ranges are inclusive of the numbers defining the range and include each integer within the defined range.

In some embodiments, the C5 to C22 percarboxylic acid has a concentration from about 0.01 wt-% to about 20 wt-% in a concentrated equilibrium composition. In other embodiments, the C5-C22 percarboxylic acid has a concentration from about 0.1 wt-% to about 10 wt-%, or from 0.5 wt-% to 5 wt-%. Without limiting the scope of the invention, the numeric ranges are inclusive of the numbers defining the range and include each integer within the defined range.

Organic Acids

The peracid compositions also include at least one organic acid. Any organic acid capable of forming a peracid can be used in the compositions and methods of the present invention. Suitable organic acids for use with the present invention include, but are not limited to, carboxylic acids and mineral acids. In some embodiments an organic acid, such as sulfuric acid, can be used a catalyst for forming the peroxycarboxylic acids.

In some embodiments, the compositions include at least one carboxylic acid. In some embodiments, the compositions include at least two, at least three, or at least four or more carboxylic acids. In some embodiments, the composition includes a mineral acid in addition to at least one carboxylic acid. Suitable mineral acids include sulfuric acid, hydrogen sulfate, nitric acid, sulfamic acid and sulfonic acids both alkyl and aryl, in particular methane sulfonic acid and dodecylbenzene, toluene, xylene, naphthalene and cumene sulfonic acid and/or phosphoric acid.

In some embodiments, the carboxylic acid for use with the compositions is a C1 to C22 carboxylic acid. In some embodiments, the carboxylic acid for use with the compositions is a short chain C1 to C4 carboxylic acid. In some embodiments, the carboxylic acid for use with the compositions of the present invention is a medium chain C5 to C22 carboxylic acid. In other embodiments, the carboxylic acid for use with the composition is a combination of a short chain C1-C4 carboxylic acid and a medium chain C5-C22 carboxylic acid. Examples of suitable carboxylic acids include, but are not limited to, formic, acetic, propionic, butanoic, pentanoic, hexanoic, heptanoic, octanoic, nonanoic, decanoic, undecanoic, dodecanoic, as well as their branched isomers, lactic, maleic, ascorbic, citric, hydroxyacetic, neopentanoic, neoheptanoic, neodecanoic, oxalic, malonic, succinic, glutaric, adipic, pimelic subric acid, and mixtures thereof.

In some embodiments, the compositions include about 10 wt-% to about 80 wt-%, about 15 wt-% to about 60 wt-%, or about 15 wt-% to about 40 wt-% of a carboxylic acid. In some embodiments, the compositions include acetic acid. In other embodiments, the compositions include octanoic acid. In other embodiments, the compositions include a combination of octanoic acid and acetic acid.

Oxidizing Agent

The peracid compositions also include an oxidizing agent. The oxidizing agent can be effective to convert an acid into a peracid. The oxidizing agent may include a peroxide source. Oxidizing agents suitable for use with the compositions include the following types of compounds or sources of these compounds, or alkali metal salts including these types of compounds, or forming an adduct therewith: hydrogen peroxide, urea-hydrogen peroxide complexes or hydrogen peroxide donors of: group 1 (IA) oxidizing agents, for example lithium peroxide, sodium peroxide; group 2 (IIA) oxidizing agents, for example magnesium peroxide, calcium peroxide, strontium peroxide, barium peroxide; group 12 (IIB) oxidizing agents, for example zinc peroxide; group 13 (IIIA) oxidizing agents, for example boron compounds, such as perborates, for example sodium perborate hexahydrate of the formula $Na_2[B_2(O_2)_2(OH)_4]\cdot 6H_2O$ (also called sodium perborate tetrahydrate); sodium peroxyborate tetrahydrate of the formula $Na_2B_2(O_2)_2[(OH)_4]\cdot 4H_2O$ (also called sodium perborate trihydrate); sodium peroxyborate of the formula $Na_2[B_2(O_2)_2(OH)_4]$ (also called sodium perborate monohydrate); group 14 (IVA) oxidizing agents, for example persilicates and peroxycarbonates, which are also called percarbonates, such as persilicates or peroxycarbonates of alkali metals; group 15 (VA) oxidizing agents, for example peroxynitrous acid and its salts; peroxyphosphoric acids and their salts, for example, perphosphates; group 16 (VIA) oxidizing agents, for example peroxysulfuric acids and their salts, such as peroxymonosulfuric and peroxydisulfuric acids, and their salts, such as persulfates, for example, sodium persulfate; and group VIIa oxidizing agents such as sodium periodate, potassium perchlorate. Other active inorganic oxygen compounds can include transition metal peroxides; and other such peroxygen compounds, and mixtures thereof.

In some embodiments, the compositions employ one or more of the inorganic oxidizing agents listed above. Suitable inorganic oxidizing agents include ozone, hydrogen peroxide, hydrogen peroxide adduct, group IIIA oxidizing agent, or hydrogen peroxide donors of group VIA oxidizing agent, group VA oxidizing agent, group VIIA oxidizing agent, or mixtures thereof. Suitable examples of such inorganic oxidizing agents include percarbonate, perborate, persulfate, perphosphate, persilicate, or mixtures thereof.

In some embodiments, the oxidizing agent includes hydrogen peroxide, or a source or donor of hydrogen peroxide. Hydrogen peroxide can be provided as a mixture of hydrogen peroxide and water, e.g., as liquid hydrogen peroxide in an aqueous solution. Hydrogen peroxide is commercially available at concentrations of 35%, 50%, 70%, and 90% in water.

The compositions may contain an effective amount of an oxidizing agent. In some embodiments, the compositions include about 0.001 wt-% to about 60 wt-% of the oxidizing agent, or about 1 wt-% to about 55 wt-% of the oxidizing agent. In some embodiments, the compositions include about 15 wt-% to about 50 wt-% of the oxidizing agent. It is to be understood that all ranges and values between these ranges and values are encompassed by the present invention.

Solvent

The liquid peroxycarboxylic acid compositions described herein include a solvent or solubilizer. In embodiments, the solvent is water. The water may be provided by the use of aqueous reagents, viz. oxidizing agent. In other embodiments, an additional amount of water is added to the peracid compositions.

In some embodiments, the formed liquid peracid composition is a composition including more than 5 wt-% water but less than 90 wt-%. The amount of water included in the liquid composition can be for example, less than about 80 wt-%, less than about 70 wt-%, and less than about 60 wt-% by weight of the liquid composition. In some embodiments, the composition can contain water between about 5 wt-% and about 50 wt-%, or about 10 wt-% and about 50 wt-%.

In some embodiments, the solvent (i.e. water) added to the peracid-forming composition is from about 1 wt-% water but less than 50 wt-%. The amount of water added to the composition can be for example, from about 1 wt-% water but less than 20 wt-%, or from about 1 wt-% water but less than 10 wt-%. It is to be understood that all values and ranges between these values and ranges are encompassed by the methods of the present invention.

Peracid-Stable Surfactant

In some embodiments, the compositions include a peracid-stable surfactant to couple hydrophobic peracid in the composition to achieve a stable mixed peracid composition. The surfactant(s) may be used to aid in maintaining the solubility of the peroxycarboxylic acid components. In forming a mixed peracid composition that is SOA/PSOA-free, a surfactant coupler capable of solubilizing a medium chain peroxycarboxylic acid is necessary to replace role of PSOA/SOA as a coupler in PSOA/SOA-containing compositions. The couplers suitable for use must be chemically compatible with peracids, while having a sufficiently low critical micelle concentration (CMC) to prevent the hydrophobic peracid from leaving residues on treated fabrics. Accordingly, the low CMC to prevent residues on treated fabrics is achieved through use of a surfactant coupler having a sufficiently long alkyl chain, as opposed to conventional hydrotropes. In some embodiments, the CMC of the surfactant used, i.e. secondary alkane sulfonate is about 0.6 g/L in DI water, however, skilled artisans will ascertain the CMC range of suitable surfactants may range from about 0.1 g/L to about 10 g/L in DI water.

As described herein the surfactant couplers do not include hydrotropes. In some embodiments the surfactant couplers are anionic surfactants. In embodiments, the surfactant couplers are secondary alkane sulfonate materials having C14-C18 carbon atoms, such as sodium C14-17 alkyl secondary sulfonate, C14-16 secondary alkanesulfonate sodium salt, or combinations thereof.

In embodiments, the peracid-stable surfactants couplers are not hydrotropes, such as those commonly used in conventional laundry bleaching and disinfectant compositions. Exemplary hydrotropes not employed in the compositions and methods disclosed herein are low molecular weight alkane sulfonate such as n-octane sulfonate and aromatic sulfonate materials such as toluene sulfonate, xylene sulfonates, naphthalene sulfonate, dialkyldiphenyl oxide sulfonate materials, and cumene sulfonates.

A peracid-stable surfactant coupler or combination of peracid-stable surfactant couplers can be present in the compositions at an amount of from between about 1 wt-% to about 20 wt-%. In other embodiments, a hydrotrope or combination of hydrotropes can be present at about 1 wt-% to about 10 wt-% of the composition, or more preferably, at about 1 wt-% to about 5 wt-%. In other embodiments, a hydrotrope or combination of hydrotropes is present at about 0.1 wt-% to about 5 wt-% on an actives basis of the composition. Without limiting the scope of invention, the numeric ranges are inclusive of the numbers defining the range and include each integer within the defined range. Beneficially, the peracid-stable surfactant couplers are employed at a lower concentration in the composition than conventional hydrotrope couplers while providing functional benefits to the compositions.

Additional Functional Ingredients

The laundry bleaching and disinfectant peracid compositions may also include additional functional ingredients. Additional functional ingredients suitable for use in the present compositions and methods include, but are not limited to, scale inhibitors, corrosion inhibitors, anionic polymers, stabilizing agents, acidulants, dispersants, antimicrobial agents (e.g. hypochlorite, bromide and the like), solidification agent, aesthetic enhancing agent (i.e., colorant (e.g., pigment), odorant, or perfume), wetting agents, defoaming agents, thickening or gelling agents, among any number of constituents which can be added to the composition. Such adjuvants can be preformulated with the peracid compositions or added to the compositions after formation, but prior to use. The compositions can also contain any number of other constituents as necessitated by the application, which are known, and which can facilitate the activity of the present compositions.

Stabilizers

In some embodiments, the peracid compositions may also include stabilizers. Stabilizers (also referred to as "stabilizing agents") are commonly added to equilibrium peracid compositions to stabilize the peracid and hydrogen peroxide and prevent the decomposition of these constituents. Examples of stabilizing agents may include for example, surfactants, couplers, hydrotropes, acid catalysts and the like that are conventionally used in equilibrium peracid compositions to stabilize and improve shelf life of the composition. Further examples of stabilizing agents include, for example, chelating agents or sequestrants. Such sequestrants include, but are not limited to, organic chelating compounds that sequester metal ions in solution, particularly transition metal ions. Such sequestrants include organic amino- or hydroxy-polyphosphonic acid complexing agents (either in acid or soluble salt forms), carboxylic acids (e.g., polymeric polycarboxylate), hydroxycarboxylic acids, aminocarboxylic acids, or heterocyclic carboxylic acids, e.g., pyridine-2,6-dicarboxylic acid (dipicolinic acid). Dipicolinic acid, 1-hydroxy ethylidene-1,1-diphosphonic acid ($CH_3C(PO_3H_2)_2OH$) (HEDP) are further example of stabilizing agents.

Additional examples of stabilizing agents commonly used in equilibrium chemistry to stabilize the peracid and hydrogen peroxide and/or prevent the premature oxidation of the composition include phosphonic acid or phosphonate salt. Phosphonic acids and phosphonate salts include HEDP; ethylenediamine tetrakis methylenephosphonic acid (EDTMP); diethylenetriamine pentakis methylenephosphonic acid (DTPMP); cyclohexane-1,2-tetramethylene phosphonic acid; amino[tri(methylene phosphonic acid)]; (ethylene diamine[tetra methylene-phosphonic acid)]; 2-phosphene butane-1,2,4-tricarboxylic acid; or salts thereof, such as the alkali metal salts, ammonium salts, or alkyloyl amine salts, such as mono, di, or tetra-ethanolamine salts; picolinic, dipicolinic acid or mixtures thereof. In some embodiments, organic phosphonates, e.g., HEDP are well known as used stabilizing agents.

Stabilizers can be added to the peracid composition. Preferably the stabilizer is in the peracid composition in a concentration of between about 100 ppm and about 5 wt. %.

Surfactant

In some embodiments, the peracid compositions of the present invention may include an additional surfactant. Surfactants may be included as a solubilizer for the peracid compositions (e.g. microemulsion forming surfactant). Surfactants suitable for use with the compositions of the present invention include, but are not limited to, anionic surfactants, nonionic surfactants, cationic surfactants, amphoteric surfactants, zwitterionic surfactants, mixtures thereof, or the like.

The solubilizer can include a microemulsion forming surfactant. Suitable microemulsion forming surfactants include anionic surfactants, cationic surfactants, amphoteric surfactants, zwitterionic surfactants, mixtures thereof, or the like. Suitable microemulsion forming surfactants include anionic surfactants, such as sulfate surfactant, sulfonate surfactant, phosphate surfactant (phosphate ester surfactant), and carboxylate surfactant, mixtures thereof, or the like.

Surfactants can be added to the peracid composition. Preferably, the surfactant is in the peracid composition in a concentration of between about 0 wt-% and about 20 wt-%.

EMBODIMENTS

Exemplary ranges of the bleaching and disinfectant peracid compositions are shown in Table 1 in weight percentage of the equilibrium peracid compositions. The compositions can be formed in a concentrate, aqueous, or a thickened aqueous liquid concentrate for use in forming a use composition.

TABLE 1

| Component | First Exemplary Range (wt-%) | Second Exemplary Range (wt-%) | Third Exemplary Range (wt-%) |
|---|---|---|---|
| Hydrophilic (C1-C4) Percarboxylic acid | 0.1-40 | 1-30 | 1-20 |
| Hydrophobic (C5-C22) Percarboxylic acid | 0.01-20 | 0.1-10 | 0.5-5 |

TABLE 1-continued

| Component | First Exemplary Range (wt-%) | Second Exemplary Range (wt-%) | Third Exemplary Range (wt-%) |
|---|---|---|---|
| Organic Acid | 10-95 | 15-60 | 15-40 |
| Oxidizing Agent | 0.001-60 | 1-55 | 15-50 |
| Surfactant Coupler | 1-20 | 1-10 | 1-5 |
| Solvent | 1-90 | 1-50 | 2-50 |
| Additional Functional Ingredients (stabilizing agents, surfactants) | 0-30 | 0-20 | 0-10 |

Further, exemplary ranges of one embodiment of the bleaching and disinfectant peracid compositions are shown in Table 2 in weight percentage of the equilibrium peracid compositions.

TABLE 2

| Component | First Exemplary Range (wt-%) | Second Exemplary Range (wt-%) | Third Exemplary Range (wt-%) |
|---|---|---|---|
| Peroxyacetic Acid | 0.1-40 | 1-30 | 1-20 |
| Peroctanoic Acid | 0.01-20 | 0.1-10 | 0.5-5 |
| Acetic Acid and Octanoic Acid | 10-95 | 15-60 | 15-40 |
| Hydrogen Peroxide | 0.001-60 | 1-55 | 15-50 |
| $C_{14}$-$C_{16}$ Secondary Alkane Sulfonate (Anionic surfactant) | 1-20 | 1-10 | 1-5 |
| Water | 1-90 | 1-50 | 2-50 |
| Additional Functional Ingredients (stabilizing agents, surfactants) | 0-30 | 0-20 | 0-10 |

Without being limited according to the invention, all ranges recited are inclusive of the numbers defining the range and include each integer within the defined range.

Methods of Use

In preferred aspects, the compositions are to be employed in the bleaching and disinfecting of laundry soils and cleaning articles, e.g., textiles, which have become soiled. According to embodiments, the compositions of described herein can be used to remove stains from any conventional textile, including but not limited to, cotton, poly-cotton blends, wool, and polyesters. The compositions can be used on any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Such textiles are commonly used as table linens, kitchen rages, chef coats, massage towels, etc. and other applications wherein greasy and oily soils are expected.

In an aspect, the compositions for treating laundry can be provided in a commercial and/or industrial laundry washing facility and can be provided in a residential and/or home laundry washing machine, including those that are programmable. Exemplary commercial and/or industrial laundry washing facilities include those cleaning textiles for the rental, health care, and hospitality industries.

In another aspect, the compositions can be used in a variety of domestic or industrial applications, e.g., to reduce microbial or viral populations on a surface or object or in a body or stream of water. For example, the compounds can be applied in a variety of areas including a variety of hard or soft surfaces having smooth, irregular or porous topography. Additional methods of peracid composition use on hard surfaces is provided in U.S. Pat. No. 8,277,733, which is herein incorporated by reference as it pertains to methods of employing peroxycarboxylic acid compositions on hard surfaces.

In some aspects, the present disclosure includes methods of using the peracid compositions for antimicrobial and/or bleaching activity for textile and/or laundry applications. In one aspect, the methods include using a mixed peracid composition wherein more than one peroxycarboxylic acids are formed in a single composition. In a further aspect, the methods include using a mixed peracid composition that is PSOA/SOA-free.

In some embodiments, these methods employ the bleaching and/or disinfecting activity of the compositions for textile and/or laundry applications. For example, a method for reducing a microbial population, odor, and staining, and/or a method for bleaching. These methods preferably operate on an article, surface, in a body or stream of water or a gas, or the like, by contacting the article, surface, body or stream of water with the compositions. The compositions described herein can also be used for laundry or textile applications. The compositions can be employed by rinsing laundry or textile surfaces with the use solution, keeping the surfaces wet for a sufficient time to wash, de-stain, sanitize, bleach and/or rinse the surface.

In embodiments for laundry treatments, namely a method for treating laundry, various items or articles may be cleaned in a laundry application, such as a washing machine, both institutional and consumer use. Laundry suitable for cleaning, bleaching and/or disinfecting includes, for example, any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. The term "linen" is often used to describe certain types of laundry items including bed sheets, pillowcases, towels, table linen, tablecloth, bar mops and uniforms.

The laundry applications may be performed in a laundry washing machine. Exemplary laundry washing machines includes a drum having an interior for holding laundry, a motor constructed and arranged for rotating the drum, a water inlet for introducing water into the drum interior, a chemical inlet for introducing chemicals into the drum interior, a drain for allowing fluid to drain from the drum interior, and a processing unit constructed for operating the laundry washing machine. The processing unit can be constructed to provide a washing cycle for washing laundry with a sanitizing use solution at a pH from about 4 to about 9, and a detergent use solution and optionally a bleach activator and/or catalyst cycle for removing soil from the laundry and boosting the bleaching component of the sanitizing use solution at an alkaline pH.

It is expected that many commercial and industrial laundry washing machines are capable of handling the method for treating laundry according to the invention. Many commercial and industrial laundry washing machines are computer programmable, and computer programs can be provided to operate the machines according to the invention. In addition, it is expected that machines can be made available to treat laundry according to the invention, and that these machines can be used in both industrial and commercial applications and in home and residential applications. In addition, the treatment composition can be formulated so that it can be used in commercial and industrial laundry washing machines and residential laundry washing machines that are in common use, and are computer programmable, without modification. That is, it is expected that conventional laundry washing machines can be used to treat laundry according to the invention. Additional disclosure of exemplary laundry washing machines are set forth in U.S. Pat. No. 7,682,403, which is herein incorporated by reference in its entirety.

The methods may also include contacting the article, wherein the contacting can include any of numerous methods for applying the compositions, such as spraying the compositions, immersing the article in the compositions, or the like or a combination thereof. A concentrate or use concentration of the compositions can be applied to or brought into contact with a surface and/or an object by any conventional method or apparatus for applying an antimicrobial or bleaching compound to an object. For example, the object can be wiped with, sprayed with, foamed on, and/or immersed in the compositions, or a use solution made from the compositions. The compositions can be caused to flow over the surface, or the surface can be dipped into the compositions. Contacting can be manual or by machine. Agitation can also be employed in the methods as is customary in laundry applications.

In some aspects, the compositions are present at an amount effective for killing one or more of various pathogenic microorganisms, including bacteria, and including, but not limited to, *Salmonella, Staphylococcus, Campylobacter, Pseudomonas, Listeria, Streptococci, Legionella, Escherichia coli*, tuberculosis, phages, mycobacteria, yeast, mold, fungi, spores, viruses, or the like. The compositions of the present invention have activity against a wide variety of microorganisms such as Gram positive (for example, *Listeria monocytogenes* or *Staphylococcus aureus*) and Gram negative (for example, *Escherichia coli* or *Pseudomonas aeruginosa*) bacteria, yeast, molds, bacterial spores, viruses, etc. In addition, the compositions, as described above, have activity against a wide variety of human pathogens.

In some embodiments, the articles to be cleaned are contacted with compositions described herein including one or more peroxycarboxylic acids. In certain embodiments of the invention, the C1-C4 percarboxylic acid has a concentration from about 0.1 wt-% to about 40 wt-% in a concentrated equilibrium composition. In other embodiments, the C1-C4 percarboxylic acid has a concentration from about 1 wt-% to about 30 wt-%, or from about 1 wt-% to 20 wt-%. Without limiting the scope of the invention, the numeric ranges are inclusive of the numbers defining the range and include each integer within the defined range.

In some embodiments, the C5 to C22 percarboxylic acid has a concentration from about 0.01 wt-% to about 20 wt-% in a concentrated equilibrium composition. In other embodiments, the C5-C22 percarboxylic acid has a dose concentration from about 0.1 wt-% to about 10 wt-%, or from 0.5 wt-% to 5 wt-%. Without limiting the scope of the invention, the numeric ranges are inclusive of the numbers defining the range and include each integer within the defined range.

In an embodiment, the bleaching and disinfectant peracid compositions contact the articles to be treated for a period of between about 5 minutes to about 60 minutes, or at least about 20 minutes, at least about 30 minutes, at least about 60 minutes, or longer. In other embodiments, the contacting is for a period of between about 5 minutes to about 30 minutes, or from between about 5 minutes to about 20 minutes. In many embodiments, it is expected that sufficient bleaching and disinfection can occur at a time of between about 1 and about 20 minutes, at a time of between about 2 and about 15 minutes, and a time of between about 3 minutes and about 10 minutes.

In an embodiment, the bleaching and disinfectant peracid compositions as described herein are employed in low temperature laundry applications. As referred to herein, low temperature laundry includes temperatures at or below about 60° C. In an embodiment, the temperature of the rinse water is up to about 50° C., preferably in the range of 20° C. to 50° C., preferably in the range of 30° C. to 50° C., and most preferably in the range of 30° C. to 45° C.

In an embodiment the bleaching and disinfectant peracid composition is dosed separately or in combination with a detergent composition. In a preferred embodiment, the bleaching and disinfectant peracid composition is dosed separately from a detergent composition.

In addition, the method for treating laundry can occur as part of an operation that includes additional steps, such as, washing, rinsing, finishing, and extracting. In addition, it should be understood that the step of treating laundry can include, as part of the step, additional activities such as, for example, washing and finishing.

In addition, the various compositions used in the laundering process can further include adjuvants. Adjuvant use solutions employed in laundering methods can include at least one of souring agents, fabric softening agents, starch, anti-wrinkle agents, sizing agents, color-fastness agents, oil and water repellant agents, water conditioning agents, iron controlling agents, water threshold agents, soil releasing agents, soil shielding agents, optical brightening agents, fragrances, and mixtures thereof.

The invention is further illustrated by the following examples, which should not be construed as further limiting.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following ingredients are utilized in the Examples:

Hostapur® SAS 30: Sodium $C_{14}$-17 secondary alkane sulfonate, a hydrotrope and anionic surfactant, available from Clariant.

Commercially available acetic acid, 2,6-dipicolinic acid, hydrogen peroxide 50%, hydroxyethylidene diphosphonic acid (HEDP) 60%, octanoic acid, and sulfuric acid 96%.

Example 1

Compositions shown in Table 3 (for forming a peroxycarboxylic acid composition) were analyzed in the Examples and iodometric titration were performed using procedures set forth in QATM 317 to determine peracetic acid and hydrogen peroxide content. The method includes two steps for the determination of the peracid and hydrogen peroxide content. The first step is an iodometric titration while suppressing the hydrogen peroxide oxidative property by dilution and cold temperatures (ice water; the presence of ice does not interfere with the titration chemistry in the reaction flask). The second step uses the same sample and measures hydrogen peroxide content by the addition of sulfuric acid and molybdenum catalyst, reagents that rapidly accelerate the hydrogen peroxide oxidation of iodide. The hydrogen peroxide concentration is determined by taking the difference between the volume of titrant used for the peracid endpoint and the volume required to reach the hydrogen peroxide end point.

1. Titration of peracetic acid or peroxyoctanoic acid: Aliquot the peracid sample into a 250 mL Erlenmeyer flask. Fill the flask to approximately 200 mL with ice water (0° C.-10° C.). Add 2 mL of 2% starch indicator and 5 mL of 10% KI (potassium iodide) to the flask. Place the flask on a stir plate and immediately titrate with 0.1N sodium thiosulfate to a colorless endpoint that persists for at least 20 seconds. Record the titrant volume (EP1).
2. Titration of hydrogen peroxide: Do not refill the buret from the peracid titration. Add 12 mL 9N sulfuric acid and 10-15 drops of 1N ammonium molybdate to the flask. The solution will change back to a blue-black color. Titrate to a second colorless endpoint that persists for at least 20 seconds. Record the titrate volume (EP2).

The peracetic acid and hydrogen peroxide content are calculated as follows:

Peracetic Acid Content:

$$\text{Acid} = \%\ \text{Peracetic}\frac{(\text{mL to } EP1)(N)(38)(100\%)}{(spl\ wt,\ g)(1000)}$$

Where N=normality of thiosulfate titrant

38=equivalent weight of Peracetic Acid

1000=conversion from milliequivalents to equivalents

Peroxyoctanoic Acid Content:

$$POOA = \%\frac{(\text{mL to } EP1)(N)(80)(100\%)}{(spl\ wt,\ g)(1000)}$$

Where N=normality of thiosulfate titrant

80=equivalent weight of Peroxyoctanoic Acid

1000=conversion from milliequivalents to equivalents

Hydrogen Peroxide Content:

$$O_2 = \%\ H_2\frac{(\text{mL to } EP2 - \text{mL to } EP1)(N)(17)(100\%)}{(spl\ wt,\ g)(1000)}$$

Where N=normality of thiosulfate titrant

17=equivalent weight of hydrogen peroxide

1000=conversion from milliequivalents to equivalents

TABLE 3

| Ingredient | Formulation A (wt-%) | Formulation B (wt-%) | Formulation C (wt-%) |
|---|---|---|---|
| Octanoic Acid | 3.87 | 3.87 | 3.87 |
| Acetic Acid | 28.50 | 28.50 | 28.50 |
| Hydrogen Peroxide (50%) | 50.0 | 50.0 | 50.0 |
| Hostapur SAS 30 (30%) | 7.00 | 7.00 | 7.00 |
| 2,6-Dipicolinic Acid | 0.05 | 0.10 | 0.05 |
| Sulfuric Acid (96%) | 0.475 | 0.475 | 0.475 |
| HEDP (60%) | 0.0 | 0.0 | 1.0 |
| DI Water | 10.105 | 10.051 | 9.105 |
| Total | 100 | 100 | 100 |
| After Equilibrium | | | |
| Peroctanoic Acid (POOA) | 1.34 | 1.37 | 1.37 |
| Peracetic Acid (POAA) | 12.84 | 12.73 | 13.04 |
| Hydrogen Peroxide | 18.39 | 18.49 | 18.23 |

Example 2

The antimicrobial efficacy of Formulation A, Formulation B, and Formulation C were evaluated under EN 14348 test procedures, a quantitative suspension test for evaluation of mycobactericidal activity of chemical disinfectants. A test suspension of mycobacteria in a solution of an interfering substance is added to a sample of the product as delivered and diluted with hard water. The mixture is maintained at 20° C. for 60 minutes+/−10 seconds. At the end of this contact time an aliquot is taken; the mycobactericidal and/or the mycobacteriostatic activity in this portion is immediately neutralized or suppressed by a validated method. The numbers of surviving mycobacteria in each sample are determined and the reduction is calculated.

Methods and Materials:

Pipette 1 mL of interfering substance (dirty or clean conditions) into a tube, add 1 mL of the test suspension. Start stopwatch immediately, mix and place the tube in a water bath controlled at the chosen temperature for 2 minutes+/−10 seconds. At the end of this time add 8 mL of one of the products test solutions. Restart the stopwatch at the beginning of the addition, mix and place tube in water bath controlled at chosen temperature and chosen contact time. Just before the end of the contact time mix.

Take 1 mL sample of the test mixture and transfer into a tube containing 8 mL of neutralizer and 1 mL of water. Mix and place in water bath controlled at 20° C. After neutralization time of 5 minutes, immediately take a sample of 1 mL of neutralized test mixture and plate in duplicate. Transfer sample and divide in nearly equal amounts onto two separate plates containing Middlebrook 7H10+10% OADC enrichment. Additionally transfer 0.5 ml of the test mixture into a tube containing 4.5 mL of neutralizer 10-1 mix and dilute accordingly to produce 10-2 and 10-3 dilutions of test sample.

Perform the procedure applying other obligatory and if appropriate other additional experimental conditions. Each test is verified with a neutralization control and Inoculum Numbers. Incubation Period: 35° C. for 21 days.

The exemplary test formulations were evaluated against *Mycobacterium avium* at 40° C. under dirty soil conditions and a pH of 8. Each formulation was evaluated at doses of 2 mL/L and 3 mL/L (test substance/dose), where *M. avium* was exposed to each of the formulations for a 10-minute exposure time. The results are shown in FIG. 1, where the $\log_{10}$ reduction of *M. avium* are presented for each formulation.

As shown in the results in FIG. 1, a $\log_{10}$ reduction of 4 or greater was considered to be effective against *M. avium*. Although the $\log_{10}$ reduction for each of the formulations were comparable, the $\log_{10}$ reduction of Formulation C was most efficacious with both doses achieving a $\log_{10}$ reduction greater than 4, and with Formulation A having efficacy at a dose of 3 mL/L.

Example 3

Figure 2:
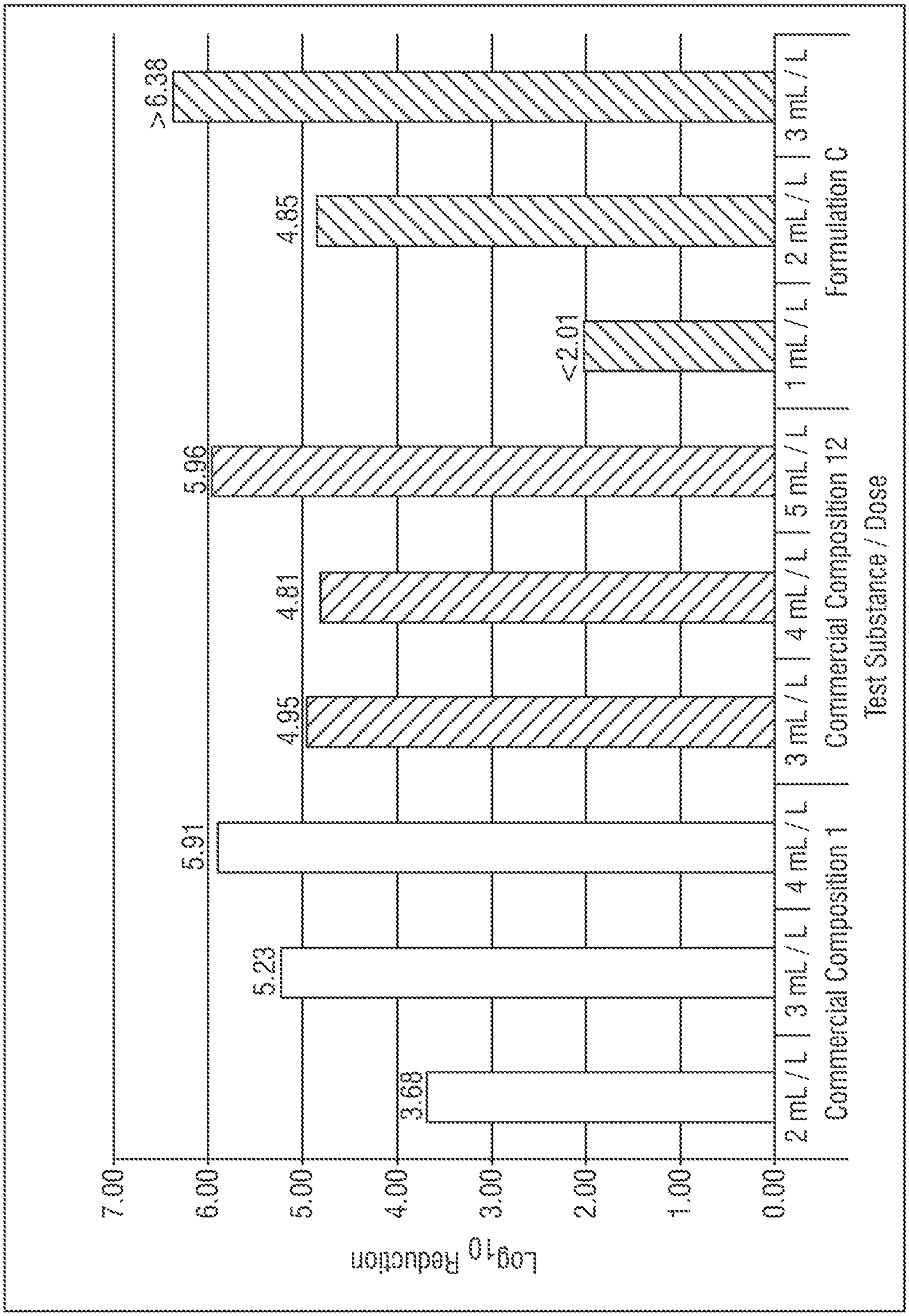
FIG. 2 shows a graph measurement of the log 10 reduction of *Mycobacterium avium* after a 10 minute exposure to a Commercial Composition 1, Commercial Composition 2, and Formulation C of the evaluated laundry bleach and disinfectant compositions disclosed in the Examples.

The antimicrobial efficacy of Formulation C was evaluated against two comparative commercially available laundry bleach and disinfectant products. Commercial Composition 1 contains a peracetic acid based laundry product, and Commercial Composition 2 contains a mixture of peracetic acid, peroctanoic acid, and PSOA. Formulation C and the commercially available laundry bleach and disinfectant products were evaluated under EN 14348 test procedures against *M. avium* at 40° C. under dirty soil conditions and a pH of 8. Each formulation was evaluated at varied doses of between 1 mL/L to 5 mL/L (test substance/dose), where *M. avium* was exposed to each of the formulations for a 10-minute exposure time. The results are shown in FIG. 2, where the $\log_{10}$ reduction of *M. avium* are presented for each formulation.

As shown in the results, not only was Formulation C comparable to the commercially available laundry bleach and disinfectant products, Formulation C performed better than the commercially available products. As shown in FIG. 2, the $\log_{10}$ reduction of Composition C exceeded the $\log_{10}$ reduction of Commercial Composition 1 at a dose of 2 mL/L, and further exceeded the $\log_{10}$ reduction of both Commercial Compositions 1 and 2 at a dose of 3 mL/L. Therefore, the results show that a laundry bleach and disinfectant composition of the present application can achieve efficacy against *M. avium* after a 10 minute exposure time at temperatures of 40° C., and further is more efficacious than current commercially available laundry bleach and detergent products.

Example 4

Doses needed to pass efficacy standards as laundry disinfectants were evaluated for Formulation C, Comparative Composition 1, and Comparative Composition 2. Test procedures EN 14348 and EN 13624 were utilized to determine the minimum dose required to pass each test. EN 13624 is a quantitative suspension test for the evaluation of fungicidal or yeasticidal activity. Under EN 14348, the tested compositions were evaluated against *M. avium* at a temperature of 40° C. with a 10-minute exposure time. Under EN 13624, the tested compositions were evaluated against *Aspergillus brasiliensis* (*A. brasiliensis*) at a temperature of 40° C. with a 15-minute exposure time. The results are shown in Table 4.

TABLE 4

| Composition | Total Peracid as POAA | EN 14348 *M. avium* | EN 13624 *A. brasiliensis* |
|---|---|---|---|
| Formulation C | 13.71% | 2 mL/L | >5 mL/L |
| Comparative Composition 1 | 16.88% | 3 mL/L | 7 mL/L |
| Comparative Composition 2 | 6.67% | 4 mL/L | >9 mL/L |

As shown in Table 4, a lower dose of Formulation C is needed to achieve efficacy against both *M. avium* and *A. brasiliensis* in comparison to both the comparative commercially available products. The results show that not only is the laundry bleach and disinfectant composition of the present application more efficacious than current commercial products, lower doses are required of the present formulations to pass efficacy standards as a laundry disinfectant.

Example 5

The bleach performance of Formulation C was evaluated on tea, red wine, coffee and black currant stain under various pH conditions. The first step included the application of a lotion emulsion at a dose of 1 mL/L at a temperature of 30° C. for 5 minutes. Without draining, the second step was performed. The second step included the application of Formulation C at a dose of 2 mL/L at a temperature of 40° C. for 10 minutes. A commercially available alkali laundry detergent was added to reach various pH levels of 6, 8, 9.5, and 10. The bleaching performance was evaluated based on the percent of stain removal. The results are shown in Table 5.

TABLE 5

| | % Stain Removal | | | |
|---|---|---|---|---|
| pH | Tea | Red Wine | Coffee | Black Currant |
| 6 | 85.76% | 85.75% | 86.49% | 87.27% |
| 8 | 85.95% | 84.64% | 86.33% | 86.62% |
| 9.5 | 84.05% | 82.49% | 85.34% | 86.22% |
| 10 | 83.49% | 81.09% | 85.73% | 86.36% |

As shown from the results in Table 5, the combination of an alkali laundry detergent in combination with the mixed peracid composition of the present application was very efficient in removing various bleachable stains across all pH levels of 6-10.

Example 6

Mixed peroxycarboxylic acid compositions using surfactants compared to hydrotropes as coupling agent to solubilize the hydrophobic carboxylic acid/peroxycarboxylic acid in aqueous carrier (water) were evaluated as shown in Table 6.

TABLE 6

| | Formulation D | | Formulation E | |
|---|---|---|---|---|
| | Wt. % | Active Wt. % | Wt. % | Active Wt. % |
| Octanoic acid | 3.87 | 3.87 | 3.87 | 3.87 |
| Acetic acid | 28.50 | 28.50 | 28.50 | 28.50 |

TABLE 6-continued

| | Formulation D | | Formulation E | |
|---|---|---|---|---|
| | Wt. % | Active Wt. % | Wt. % | Active Wt. % |
| H2O2 (50%) | 50.0 | 25.0 | 50.0 | 25.0 |
| Sodium secondary alkane sulfonate (30%) (surfactant) | 7.00 | 2.10* | 0.00 | 0.00 |
| Sodium cumene sulfonate (93%) (hydrotrope) | 0.00 | 0.00 | 9.36 | 8.71* |
| Sulfuric acid (50%) | 1.00 | 0.50 | 1.00 | 0.50 |
| DPA | 0.05 | 0.05 | 0.05 | 0.05 |
| HEDP (60%) | 1.0 | 0.6 | 1.0 | 0.6 |
| DI water | 8.58 | 41.48 | 6.72 | 41.48 |
| Total | 100.00 | 100.00 | 100.00 | 100.00 |
| Total peracid as POAA% after equilibrium | 14.48 | | 15.91 | |
| H2O2% after equilibrium | 18.17 | | 17.15 | |

*Minimum amount needed to afford the stable homogeneous solution

As demonstrated in Table 6, in order to make the compositions stable and homogeneous solutions, significantly higher amount of hydrotrope was needed compared to the amount of surfactant. The sole role of these couplers, especially hydrotropes is for the coupling of the hydrophobic carboxylic acid/peroxycarboxylic acid in the concentered composition. They do not deliver performance in use solution and it is therefore preferable to minimize the amount of couplers used in the formulas. While not intended to be limited to a particular mechanism of action or theory, surfactants aid in solubilizing hydrophobic carboxylic acid/peroxycarboxylic through the formation of micelles. In contrast, hydrotropes cannot form micelles and instead rely on continued phase to solubilize hydrophobic carboxylic acid/peroxycarboxylic, and as a result significantly higher amount is needed.

Example 7

A study to evaluate octanoic acid residues on treated fabrics using mixed peroxycarboxylic acid compositions with surfactant versus hydrotrope as coupling agent was completed. To 1.0 liter of 0.2% mixed peroxycarboxylic acid solution in 5 Grain water was added 10 pieces of weighted cotton swatches soiled with Ketchup (3.25×4.254 inch, Testfabrics Inc.), the swatches were treated for 10 min. in the solution with agitation. The treated swatches were then rinsed with water, and extracted with methanol (3×25 ml). The methanol was concentrated by evaporation. The octanoic acid in methanol was quantified by HPLC analysis, and the level of octanoic acid on fabrics was calculated based on the weight of methanol. The results are summarized in Table 7.

TABLE 7

| Mixed Peracid | Swatches (g) | Methanol Extract (g) | Octanoic Acid in Methanol | Octanoic on Swatches |
|---|---|---|---|---|
| Formulation D (Surfactant) | 18.1673 | 37.7 | 69 ppm | 0.0143% |
| Formulation E (Hydrotrope) | 17.9173 | 43.21 | 81 ppm | 0.0195% |

As demonstrated in Table 7, octanoic acid residues (as peroxyoctanoic acid will change to octanoic acid after treatment) are significantly lower on fabrics treated with the peroxycarboxylic acid compositions using surfactant (Form. D) instead of hydrotrope (Form. E) as coupler under the same test conditions. Lower octanoic acid residue on treated fabrics is much preferred as the accumulation of octanoic acid on fabric will cause odor. The measurement of any octanoic residue on surfaces needs to be compared on the basis of any decreases when using identical wash conditions, as reported in Table 7, as a minimum threshold cannot be established as it is a dose related outcome in terms of rinse process and conditions. Any reduction is the intended outcome and requires comparing identical wash conditions. While not intended to be limited to a particular mechanism of action or theory, in use solutions the surfactant SAS is still able to form micelle with octanoic acid and thus prevent it to deposit on the fabrics, in contrast hydrotrope such as SCS which are unable to form micelles and therefore has no function to prevent octanoic acid to accumulate on the fabrics treated.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A method of bleaching and disinfecting laundry articles comprising:

forming a mixed peroxycarboxylic acid bleaching and disinfectant composition that is free of peroxy sulfonated oleic acid (PSOA) and sulfonated oleic acid (SOA);

contacting a soiled article or surface with the composition in a laundry machine at a temperature between about 25° C. and about 50° ° C. and a use pH of at least about 6;

disinfecting the article or surface;

bleaching the article or surface; and draining and/or rinsing the composition from the laundry machine;

wherein the composition comprises:

from about 0.1 wt-% to about 40 wt-% of a hydrophilic $C_1$-$C_4$ peroxycarboxylic acid;

from about 0.01 wt-% to about 20 wt-% of a hydrophobic $C_5$-$C_{22}$ peroxycarboxylic acid;

a $C_1$-$C_4$ carboxylic acid;

a $C_5$-$C_{22}$ carboxylic acid;

an oxidizing agent;

from about 0.01 wt-% to about 10 wt-% of a stabilizing agent, wherein the stabilizing agent is dipicolinic acid;

a peroxycarboxylic acid-stable surfactant coupler having a critical micelle concentration of between 0.1 g/L to about 10 g/L, wherein the coupler is an anionic surfactant; and at least one additional agent.

2. The method of claim 1, wherein the composition is diluted with a solvent and/or a detergent to form a use solution.

3. The method of claim 1, wherein the pH of the composition is between about 6 and about 10, and the use pH is from about 7 to about 9.

4. The method of claim 1, wherein the temperature of the contacting is between about 25° C. and about 40° C.

5. The method of claim 1, wherein the $C_1$-$C_4$ peroxycarboxylic acid and $C_5$-$C_{22}$ peroxycarboxylic acid are present in a ratio of between about 4:1 to about 8:1.

6. The method of claim 1, wherein the contacting is for a period of about 1 minute to about 60 minutes.

7. The method of claim 1, wherein the composition provides at least substantially similar bleaching and disinfecting efficacy to peracid composition containing PSOA/SOA with or without additional peroxycarboxylic acids.

8. The method of claim 1, where the composition does not impart residues on the article or surface and/or where the composition residues on the article or surface in comparison to a laundry composition that includes a hydrotrope coupler instead of the peroxycarboxylic acid-stable surfactant coupler.

9. The method of claim 1, wherein the compositions decreases residues on the article or surface in comparison to a laundry composition that further includes a hydrotrope coupler instead of the peroxycarboxylic acid-stable surfactant coupler.

10. An equilibrium laundry bleaching and disinfectant peroxycarboxylic acid composition free of peroxy sulfonated oleic acid (PSOA) and sulfonated oleic acid (SOA) comprising:

from about 1 wt-% to about 20 wt-% peroxyacetic acid;

from about 0.5 wt-% to about 5 wt-% peroxyoctanoic acid;

from about 15 wt-% to about 40 wt-% of a carboxylic acid, wherein the carboxylic acid is a combination of acetic acid and octanoic acid;

from about 1 wt-% to about 5 wt-% of a $C_{14}$-$C_{16}$ secondary alkane sulfonate surfactant coupler having a critical micelle concentration between about 0.1 g/L to about 10 g/L;

an oxidizing agent;

up to about 10 wt-% a stabilizing agent, wherein the stabilizing agent is dipicolinic acid; and at least one additional agent.

11. The composition of claim 10, wherein the at least one additional agent comprises a stabilizing agent, a solvent, an additional surfactant, or combinations thereof.

12. The composition of claim 10, wherein the pH of the use solution diluted from the composition is between about 6 and about 10.

13. The composition of claim 10, wherein the peroxyacetic acid and peroxyoctanoic acid are present in a ratio of between about 4:1 to about 8:1, or about 6:1.

14. The composition of claim 10, wherein the surfactant coupler comprises from about 1 wt-% to about 5 wt-% on an active basis of the composition.

15. The composition of claim 10, further comprising an organic acid.

16. The composition of claim 10, further comprising a mineral acid.

* * * * *